(12) United States Patent
Wang et al.

(10) Patent No.: US 12,305,011 B2
(45) Date of Patent: May 20, 2025

(54) WAVELENGTH-CONTROLLABLE CELLULOSE IRIDESCENT FILM AND METHOD FOR PREPARATION THEREOF

(71) Applicant: South China University of Technology, Guangdong (CN)

(72) Inventors: Bin Wang, Guangdong (CN); Jinsong Zeng, Guangdong (CN); Kefu Chen, Guangdong (CN); Chengliang Duan, Guangdong (CN); Zheng Cheng, Guangdong (CN); Jinpeng Li, Guangdong (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 237 days.

(21) Appl. No.: 18/113,114

(22) Filed: Feb. 23, 2023

(65) Prior Publication Data
US 2023/0192975 A1 Jun. 22, 2023

Related U.S. Application Data

(63) Continuation of application No. PCT/CN2020/131752, filed on Nov. 26, 2020.

(30) Foreign Application Priority Data

Oct. 29, 2020 (CN) .......................... 202011180894.9

(51) Int. Cl.
C08J 5/18 (2006.01)
C08J 3/03 (2006.01)
(Continued)

(52) U.S. Cl.
CPC . *C08J 5/18* (2013.01); *C08J 3/03* (2013.01); *C08J 5/005* (2013.01); *C08J 7/02* (2013.01);
(Continued)

(58) Field of Classification Search
None
See application file for complete search history.

(56) References Cited

U.S. PATENT DOCUMENTS

| 5,629,055 A * | 5/1997 | Revol ...................... C09D 5/36 |
| | | 428/326 |
| 2008/0118765 A1* | 5/2008 | Dorgan .................. B82Y 30/00 |
| | | 525/54.3 |

(Continued)

FOREIGN PATENT DOCUMENTS

| CN | 101168616 A | * | 4/2008 |
| CN | 101735325 A | * | 6/2010 |

(Continued)

OTHER PUBLICATIONS

Machine Translation of CN-104134400-A, Nov. 2014 (Year: 2014).*

(Continued)

*Primary Examiner* — Jeffrey A Vonch
(74) *Attorney, Agent, or Firm* — LOZA & LOZA LLP; Michael Fedrick

(57) ABSTRACT

The present invention belongs to the technical field of functional film materials; disclosed are a wavelength-controllable cellulose iridescent film and a method for preparation thereof. The method is: (1) mixing well a cellulose nanocrystal (CNC) suspension with lactic acid solution and glucose solution to obtain a CNC/lactic acid/glucose mixed solution; said CNC suspension being a cellulose nanocrystal suspension; (2) drying the CNC/lactic acid/glucose mixed solution to form a film to obtain a cellulose iridescent film. The method of the present invention is simple and low in cost. In the present invention, by means of the addition of lactic acid and glucose, the prepared film has iridescent film characteristics; the wavelength of the iridescent film is (Continued)

within the range of visible light, and the wavelengths of different colors of iridescent film are controllable.

8 Claims, 5 Drawing Sheets

(51) Int. Cl.

| | | |
|---|---|---|
| *C08J 5/00* | (2006.01) | |
| *C08J 7/02* | (2006.01) | |
| *C08J 7/14* | (2006.01) | |
| *C08K 3/30* | (2006.01) | |
| *C08L 1/02* | (2006.01) | |
| *D21H 11/18* | (2006.01) | |
| *G02B 1/04* | (2006.01) | |
| *B82Y 20/00* | (2011.01) | |
| *C08J 3/215* | (2006.01) | |
| *C08K 5/1545* | (2006.01) | |
| *C08L 1/04* | (2006.01) | |
| *D21H 11/06* | (2006.01) | |

(52) U.S. Cl.
CPC ............... *C08J 7/14* (2013.01); *C08K 3/30* (2013.01); *C08L 1/02* (2013.01); *D21H 11/18* (2013.01); *G02B 1/04* (2013.01); *B82Y 20/00* (2013.01); *C08J 3/215* (2013.01); *C08J 2301/02* (2013.01); *C08J 2301/04* (2013.01); *C08J 2367/04* (2013.01); *C08J 2401/02* (2013.01); *C08J 2401/04* (2013.01); *C08K 2003/309* (2013.01); *C08K 5/1545* (2013.01); *C08K 2201/011* (2013.01); *C08K 2201/016* (2013.01); *C08L 1/04* (2013.01); *C08L 2201/50* (2013.01); *C08L 2201/54* (2013.01); *C08L 2203/16* (2013.01); *D21H 11/06* (2013.01)

(56) References Cited

U.S. PATENT DOCUMENTS

| | | | | |
|---|---|---|---|---|
| 2010/0151159 A1* | 6/2010 | Beck | ............... | B82Y 20/00 977/890 |
| 2010/0178480 A1* | 7/2010 | Colodrero | ............... | B82Y 20/00 977/773 |
| 2010/0279019 A1* | 11/2010 | Beck | ............... | C09K 19/52 427/384 |
| 2011/0183141 A1* | 7/2011 | Beck | ............... | C08J 5/18 205/86 |
| 2011/0196094 A1* | 8/2011 | Hamad | ............... | D01F 1/10 525/54.21 |
| 2011/0201755 A1* | 8/2011 | Hamad | ............... | C08L 1/286 525/63 |
| 2011/0248214 A1* | 10/2011 | Maclachlan | ............... | C01B 37/00 977/840 |
| 2012/0237750 A1* | 9/2012 | Zou | ............... | C08J 5/18 428/221 |
| 2013/0090401 A1* | 4/2013 | Hashaikeh | ............... | C08L 1/02 241/3 |
| 2013/0131332 A1* | 5/2013 | Shoseyov | ............... | C08B 37/0003 536/56 |
| 2013/0171439 A1* | 7/2013 | Shoseyov | ............... | C08B 15/00 536/56 |
| 2013/0264732 A1* | 10/2013 | Youngblood | ............... | C08L 1/02 264/28 |
| 2016/0002457 A1* | 1/2016 | Hamad | ............... | C08F 2/44 523/333 |
| 2016/0168363 A1* | 6/2016 | Nelson | ............... | C08J 3/005 106/18.11 |
| 2018/0258259 A1* | 9/2018 | Banerjie | ............... | C08L 101/16 |
| 2018/0291183 A1* | 10/2018 | Ciesielski | ............... | C08L 1/02 |
| 2020/0123275 A1* | 4/2020 | Kadota | ............... | C08B 3/00 |
| 2021/0380766 A1* | 12/2021 | Berry | ............... | C08G 18/3206 |
| 2022/0003684 A1* | 1/2022 | Chen | ............... | G01N 21/78 |

FOREIGN PATENT DOCUMENTS

| | | | | |
|---|---|---|---|---|
| CN | 102439074 A | | 5/2012 | |
| CN | 102703092 A | * | 10/2012 | |
| CN | 102924740 A | * | 2/2013 | |
| CN | 103172886 A | * | 6/2013 | |
| CN | 103183987 A | * | 7/2013 | |
| CN | 103205007 A | * | 7/2013 | |
| CN | 103450361 A | * | 12/2013 | |
| CN | 103467761 A | * | 12/2013 | |
| CN | 104086758 A | * | 10/2014 | |
| CN | 104134400 A | * | 11/2014 | |
| CN | 104292439 A | * | 1/2015 | |
| CN | 104497330 A | * | 4/2015 | |
| CN | 104693426 A | * | 6/2015 | ............. C08B 15/00 |
| CN | 105199123 A | * | 12/2015 | |
| CN | 105199150 A | * | 12/2015 | |
| CN | 105504235 A | * | 4/2016 | |
| CN | 105670044 A | * | 6/2016 | ............... C08J 5/18 |
| CN | 106751612 A | * | 5/2017 | ............... C08L 1/04 |
| CN | 108102079 A | * | 6/2018 | ............. A61K 47/34 |
| CN | 108314803 A | | 7/2018 | |
| CN | 108504056 A | * | 9/2018 | ............... C08J 5/18 |
| CN | 109486139 A | * | 3/2019 | ............. C08L 67/04 |
| CN | 109762187 A | * | 5/2019 | |
| CN | 109776883 A | * | 5/2019 | |
| CN | 110194804 A | * | 9/2019 | ............. C08B 15/04 |
| CN | 110218360 A | * | 9/2019 | ............... C08J 3/00 |
| CN | 110776656 A | * | 2/2020 | ............... C08J 5/18 |
| CN | 110818920 A | * | 2/2020 | ............... C08J 3/005 |
| FR | 3001468 A1 | * | 8/2014 | ............. C08B 15/02 |
| JP | 2011068707 A | * | 4/2011 | |
| WO | 2010066029 A1 | | 6/2010 | |
| WO | 2010124396 A1 | | 11/2010 | |
| WO | 2011123929 A1 | | 10/2011 | |
| WO | WO-2012127110 A1 | * | 9/2012 | ............. C08B 15/00 |
| WO | WO-2014118466 A1 | * | 8/2014 | ............. C08B 15/02 |
| WO | WO-2015091873 A1 | * | 6/2015 | ............... B41M 7/02 |
| WO | WO-2018033584 A1 | * | 2/2018 | ......... C09K 19/3819 |

OTHER PUBLICATIONS

Machine Translation of CN-110776656-A, Feb. 2020 (Year: 2020).*
Sun et al., Ternary Supramolecular Ensembles of Cellulose Nanocrystals Exhibiting Multiscale Deformation and Mechano/Chemoresponsive Selective Reflection of Circularly Polarized Light, Mar. 2019, ACS Sustainable Chemistry & Engineering, vol. 7, No. 7, pp. 6851-6858 (Year: 2019).*
Wang et al., Ionic Liquids Grafted Cellulose Nanocrystals for High-Strength and Toughness PVA Nanocomposite, Aug. 2020, ACS Applied Materials & Interfaces, vol. 12, No. 34, pp. 38796-38804 (Year: 2020).*
Jacobsen et al., Plasticizing Polylactide—The Effect of Different Plasticizers on the Mechanical Properties, Jul. 1999, Polymer Engineering & Science, vol. 39, No. 7, pp. 1303-1310 (Year: 1999).*
Petersson et al., Structure and thermal properties of poly(lactic acid)/cellulose whiskers nanocomposite materials, Sep. 2007, Composites Science and Technology, vol. 67, Nos. 11â12, pp. 2535-2544 (Year: 2007).*
Braun et al., Supra-Molecular EcoBioNanocomposites Based on Polylactide and Cellulosic Nanowhiskers: Synthesis and Properties , May 2012, Biomacromolecules, vol. 13, No. 7, pp. 2013â2019 (Year: 2012).*
Kelly et al., Large, Crack-Free Freestanding Films with Chiral Nematic Structures, Feb. 2013, Advanced Optical Materials, vol. 1, No. 4, pp. 295-299 (Year: 2013).*
Bardet et al., Flexibility and Color Monitoring of Cellulose Nanocrystal Iridescent Solid Films Using Anionic or Neutral Polymers, Dec. 2014, ACS Applied Materials & Interfaces, vol. 7, No. 7, pp. 4010-4018 (Year: 2014).*
Peltzer et al., Surface modiï¬cation of cellulose nanocrystalsby grafting with poly(lactic acid), Jun. 2014, Polymer International, vol. 63, No. 6, pp. 1056-1062 (Year: 2014).*

(56) References Cited

OTHER PUBLICATIONS

Chen et al., Tuning the Iridescence of Chiral Nematic Cellulose Nanocrystal Films with a Vacuum-Assisted Self-Assembly Technique, Oct. 2014, Biomacromolecules, vol. 15, No. 11, p. 4343â4350 (Year: 2014).*

Zhu et al., Supramolecular Engineering of Hierarchically Self-Assembled, Bioinspired, Cholesteric Nanocomposites Formed by Cellulose Nanocrystals and Polymers, Apr. 2016, ACS Applied Materials & Interfaces, vol. 8, No. 17, pp. 11031â11040 (Year: 2016).*

Natarajan et al., Binary Cellulose Nanocrystal Blends for Bioinspired Damage Tolerant Photonic Films, May 2018, Advanced Functional Materials, vol. 28, No. 26, p. 1800032 (Year: 2018).*

Walters et al., Iridescent Cellulose Nanocrystal Films Modified with Hydroxypropyl Cellulose, Feb. 2020, Biomacromolecules, vol. 21, No. 3, pp. 1295-1302 (Year: 2020).*

Adstedt et al., Chiral Cellulose Nanocrystals with Intercalated Amorphous Polysaccharides for Controlled Iridescence and Enhanced Mechanics, Sep. 2020, Advanced Functional Materials, vol. 30, No. 49, p. 2003597 (Year: 2020).*

International Search Report of PCT Patent Application No. PCT/CN2020/131752 issued on Aug. 3, 2021.

Gourhari Chakraborty et al., Applicability of Fe-CNC/GR/PLA Composite as Potential Sensor for Biomolecules, Journal of Materials Science: Materials in Electronics, Mar. 20, 2020.

\* cited by examiner

WAVELENGTH-CONTROLLABLE CELLULOSE IRIDESCENT FILM AND METHOD FOR PREPARATION THEREOF

CROSS REFERENCE TO RELATED APPLICATIONS

The present application is a Continuation Application of PCT Patent Application No. PCT/CN2020/131752 filed on Nov. 26, 2020, which claims the benefit of Chinese Patent Application No. 202011180894.9 filed on Oct. 29, 2020. All the above are hereby incorporated by reference in their entirety.

TECHNICAL FIELD

The present invention belongs to the field of preparation for a functional film material, particularly relates to a wavelength-controllable cellulose iridescent film and a preparation method thereof.

BACKGROUND

As a main component constituting a plant cell wall, cellulose is a reproducible polysaccharide which is distributed most widely and whose content is highest in the nature world, has excellent biocompatibility and biodegradability, and is therefore widely used for preparation and research for a functional material.

Cellulose nanocrystal (CNC) refers to a rod-like nanoscale cellulose crystal of high crystallinity prepared by removing a portion of an amorphous region within a natural cellulose fiber by means of hydrolysis or enzymolysis etc., which has characteristics of high modulus, high intensity and high crystallinity etc., and simultaneously has advantages of a biological material such as light weight, no toxicity, reproducibility, degradation and biocompatibility etc.

CNC can be prepared by a sulfuric acid-hydrolysis method, wherein a hydroxyl group on a cellulose surface is transformed into sulfate, introducing negative surface charges, in turn forming stable water dispersion of CNC. CNC is self-assembled to form a stable lyotropic chiral nematic structure at a condition of a certain concentration, which is widely used in anti-fake material, inductor and optical device due to excellent optical characteristics thereof.

An iridescent film prepared by pure CNC has the defect of big brittleness, the defect that wavelength is greatly affected by external conditions and is consequently not easy to control, and other defects, which severely affects a practicability of the CNC iridescent film. In a patent application (application number CN201080019562.0) "Control for iridescent wavelength of nanocrystal cellulose film", a method of pure mechanical energy input is adopted to obtain a desired or predetermined iridescent wavelength. Although this technique realizes the wavelength being controllable to a certain degree, the method of pure mechanical energy input has high energy consumption and bigger cost, which is not suitable for mass production by an enterprise.

SUMMARY

In order to overcome the above-described shortcomings present in the prior art, a purpose of the present invention is to provide a wavelength-controllable cellulose iridescent film and a preparation method thereof. The present invention realizes controllability for wavelengths of different colors by means of adding lactic acid and glucose, simultaneously improves brittleness of pure CNC film.

The purpose of the present invention is realized by the following technical solution:

A preparation method for a wavelength range-controllable cellulose iridescent film comprises the following steps:
(1) evenly mixing a CNC suspension with a lactic acid solution and a glucose solution, to obtain a CNC/lactic acid/glucose mixed solution, wherein the CNC suspension is a suspension of a cellulose nanocrystal; and
(2) drying the CNC/lactic acid/glucose mixed solution to form a film, to obtain the cellulose iridescent film.

In the step (1), a volume ratio of the CNC suspension to the lactic acid solution and the glucose solution is (12-8):1:(2-3).

In the step (1), a concentration of the cellulose nanocrystal in the CNC suspension is 3 wt %-4 wt %.

A concentration of the lactic acid solution is 8 wt %-10 wt %; and a concentration of the glucose solution is 10 wt %-20 wt %.

A solvent of the lactic acid solution is water; and a solvent of the glucose solution is water.

When the volume ratio of the CNC solution, the lactic acid solution and the glucose solution is 12:1:3, the film is formed to show blue color; when the volume ratio is 11:1:2, the film is formed to show green color; when the volume ratio is 10:1:2, the film is formed to show yellow color; when the volume ratio is 9:1:2, the film is formed to show orange color, and when the volume ratio is 8:1:2, the film is formed to show red color.

In the step (1), the cellulose nanocrystal in the CNC suspension has a dimension of a length of 100-400 nm, and a width of 20-50 nm.

In the step (1), the CNC suspension is prepared by the following method: mixing a wood pulp or a cellulose with a concentrated sulfuric acid, performing a heating treatment at a condition of stirring, adding water for ending a reaction, centrifuging, dialysing to neutrality, and concentrating, to obtain the CNC suspension.

A concentration of the concentrated sulfuric acid is 60 wt %-70 wt %; and a mass volume ratio of the wood pulp (absolutely dry wood pulp) or cellulose to the concentrated sulfuric acid is 1 g:(8-10) mL.

A rotation speed for the stirring is 300-400 rpm; and a temperature for the heating treatment is 45-55° C., and a time for the heating treatment is 45-55 min.

A volume ratio of the concentrated sulfuric acid to water is 1:(10-15); and water herein is water for ending the reaction.

The number of times for the centrifuging is 3-4 times, a rotation speed for the centrifuging is 8000-10000 rpm, a time for the centrifuging is 10-12 min, and a temperature for the centrifuging is 0-10° C.

A molecular weight cut-off of a dialysis bag is 12000-14000, and a dialyzate is water.

The concentrating is rotary evaporation, a temperature for the rotary evaporation is 35-45° C., and a time for the rotary evaporation is 50-60 min.

In the step (1), the evenly mixing refers to a preceding stirring treatment, and a posterior ultrasonic treatment.

A time for the stirring treatment is 20 min, a rotation speed for the stirring treatment is 300-400 rpm, a time for the ultrasonic treatment is 5-10 min, and an ultrasonic frequency for the ultrasonic treatment is 20-40 KHz.

For the lactic acid: levorotatory, dextrorotatory and racemic lactic acids may all be suitable.
}

In the step (2), the drying has the following conditions: a temperature of 30-35° C., an ambient humidity of 50-60%, and a time for the drying of 3-5 days.

The drying is performed in a polystyrene culture dish.

The present invention provides a wavelength-controllable cellulose iridescent film prepared by the above-described preparation method. The iridescent film of the present invention has a wavelength of 450-650 nm, and may be observed in different colors within a visible light range. Due to having different colors which are produced by an internal structure, and without a defect of color losing while dyeing with dyes, the iridescent film of the present invention can be used in decorative aspects for color rendering.

Compared with the prior art, the present invention has the following advantages and beneficial effects:

(1) raw materials, cellulose and lactic acid selected and used in the present invention all come from natural world, and have advantages of extensive source, low cost, and good biocompatibility etc., and both raw materials are directly used for preparation, needing no intermediate processes of chemical synthesis or the like, which may both save preparation time and achieve green environmental protection as well as no pollution;

(2) CNC prepared via sulfuric acid hydrolysis is introduced with negative charges, which is more beneficial to a uniformity of a film formed during drying the CNC suspension, and introducing the lactic acid into this system makes a controllability for a reflection wavelength of the iridescent film to be guaranteed;

(3) the preparation method adopted by the present invention is an evaporation-induced and self-assembled way, which is convenient to operate, simple to control conditions, and good in controllability; and (4) the present invention realizes controllability for wavelengths of different colors, and simultaneously improves brittleness of pure CNC film by means of adding the lactic acid and the glucose; and the film prepared by the present invention has characteristics of an iridescent film, and the film has a wavelength within the range of visible light, which has superior potential for application in aspects of decorative packaging and optical electronic devices.

DETAILED DESCRIPTION OF EMBODIMENTS

Figure 1:
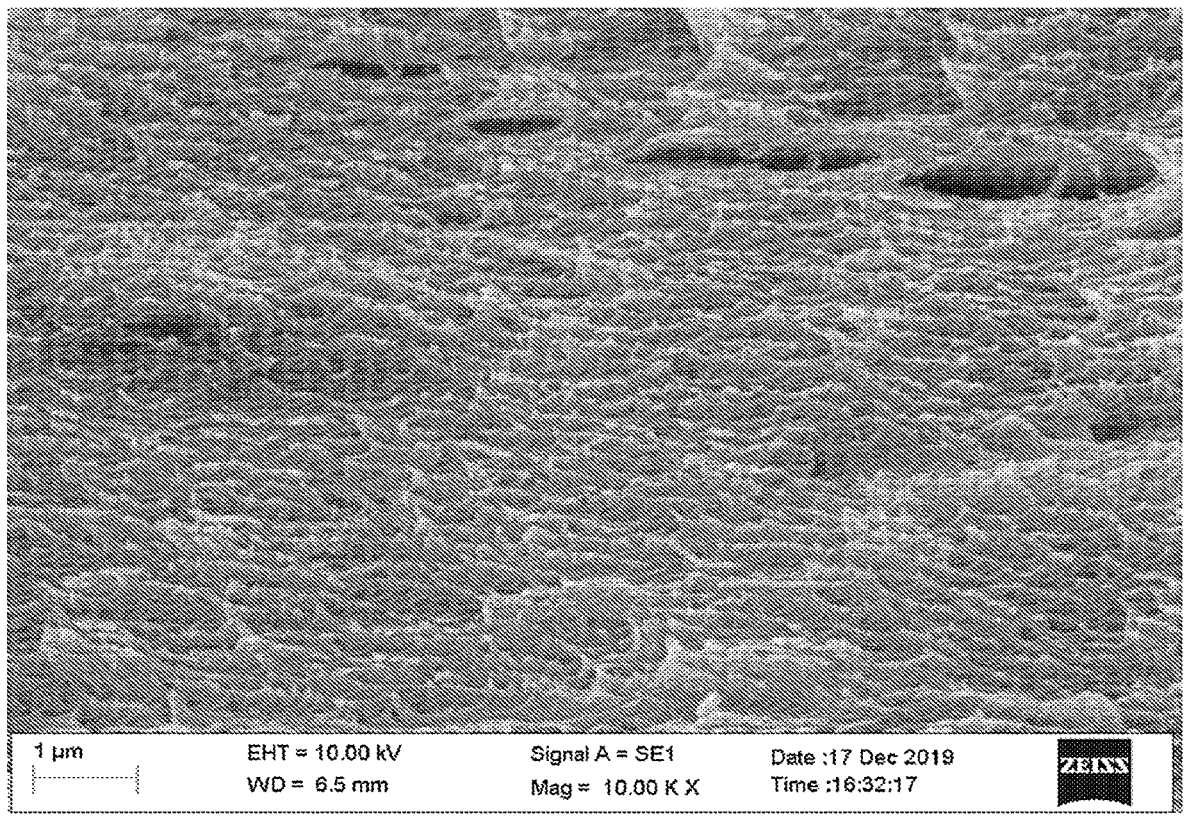
FIG. 1 is a layered distribution micrograph for the cellulose iridescent film prepared in Example 1 under a scanning electron microscope.

Particular embodiments of the present invention will be further described below in conjunction with drawings and Examples, but embodiments and protection of the present invention are not limited thereto. It should be pointed out that, if there are any processes that are not particularly described in detail below, they are all what those skilled in the art can realize or understand with reference to the prior art. If the reagents or instruments used do not indicate their manufacturers, they are regarded as conventional products that may be commercially available.

Example 1

A preparation method for a wavelength-controllable cellulose iridescent film containing a lactic acid solution and a glucose solution comprises the following steps:

(1) mixing 20 g of an absolutely dry coniferous wood pulp with 200 ml of a concentrated sulfuric acid solution having a concentration of 60 wt %, stirring at 50° C. under a rotation speed of 400 r/min for 50 min, and adding deionized water having a volume 10 times that of the concentrated sulfuric acid solution for ending a reaction, to obtain a white milky solution;

(2) centrifuging the white milky solution of the step (1) at 10° C. under a speed of 10000 r/min for 10 min, taking an upper layer of suspension, performing the centrifuging for 3 times, and combining the suspensions;

(3) pouring the combined suspension of the step (2) into a dialysis bag having a molecular weight of 14000, and dialysing with deionized water until the suspension becomes a neutral suspension;

(4) concentrating the neutral suspension obtained in the step (3) by means of a rotary evaporation, with a temperature for the rotary evaporation of 45° C. and a time for the rotary evaporation of 50 min, to obtain a CNC solution having a high concentration;

(5) formulating a lactic acid solution having a concentration of 8 wt % and a glucose solution having a concentration of 10 wt %, evenly mixing 3 wt % of the CNC suspension obtained in the step (4) with 8 wt % of the lactic acid solution and 10 wt % of the glucose solution according to a volume ratio of 12:1:3, and then performing an ultrasonic treatment at an ultrasonic frequency of 40 KHz for 10 min with a temperature controlled at 10° C., to obtain a CNC/lactic acid/glucose mixed solution; and (6) measuring 5 ml of the CNC/lactic acid/glucose mixed solution of the step (5) and filling it into a polystyrene culture dish, and naturally drying at a temperature of 30° C. and a humidity of 50% for 72 h, to obtain a CNC/lactic acid/glucose composite film, i.e. the wavelength-controllable cellulose iridescent film.

Example 2

A preparation method for a wavelength-controllable cellulose iridescent film containing a lactic acid solution and a glucose solution comprises the following steps:

(1) mixing 20 g of an absolutely dry coniferous wood pulp with 160 ml of a concentrated sulfuric acid solution having a concentration of 70 wt %, stirring at 45° C. under a rotation speed of 300 r/min for 55 min, and adding deionized water having a volume 10 times that of the concentrated sulfuric acid solution for ending a reaction, to obtain a white milky solution;

(2) centrifuging the white milky solution of the step (1) at 0° C. under a speed of 8000 r/min for 12 min, taking an upper layer of suspension, repeating the centrifuging for 4 times, and combining the suspensions;

(3) pouring the combined suspension of the step (2) into a dialysis bag having a molecular weight of 14000, and dialysing with deionized water until the suspension becomes a neutral suspension;
(4) concentrating the neutral suspension obtained in the step (3) by means of a rotary evaporation with a temperature for the rotary evaporation of 35° C. and a time for the rotary evaporation of 60 min, to obtain a CNC solution having a high concentration;
(5) formulating a lactic acid solution having a concentration of 9 wt % and a glucose solution having a concentration of 15 wt %, evenly mixing 3 wt % of the CNC suspension obtained in the step (4) with 9 wt % of the lactic acid solution and 15 wt % of the glucose solution according to a volume ratio of 11:1:2, and then performing an ultrasonic treatment at an ultrasonic frequency of 20 KHz for 10 min with a temperature controlled at 10° C., to obtain a CNC/lactic acid/glucose solution mixed solution; and
(6) measuring 5 ml of the CNC/lactic acid/glucose mixed solution of the step (5) and filling it into a polystyrene culture dish, and naturally drying at a temperature of 35° C. and a humidity of 60% for 96 h, to obtain a CNC/lactic acid/glucose composite film, i.e. the wavelength-controllable cellulose iridescent film.

Example 3

A preparation method for a wavelength-controllable cellulose iridescent film containing a lactic acid solution and a glucose solution comprises the following steps:
(1) mixing 20 g of an absolutely dry coniferous wood pulp with 180 ml of a concentrated sulfuric acid solution having a concentration of 64 wt %, stirring at 55° C. under a rotation speed of 350 r/min for 45 min, and adding deionized water having a volume 10 times that of the concentrated sulfuric acid solution for ending a reaction, to obtain a white milky solution;
(2) centrifuging the white milky solution of the step (1) at 5° C. under a speed of 10000 r/min for 11 min, taking an upper layer of suspension, repeating the centrifuging for 3 times, and combining the suspensions;
(3) pouring the combined suspension of the step (2) into a dialysis bag having a molecular weight of 14000, and dialysing with deionized water until the suspension becomes a neutral suspension;
(4) concentrating the neutral suspension obtained in the step (3) by means of a rotary evaporation with a temperature for the rotary evaporation of 40° C. and a time for the rotary evaporation of 55 min, to obtain a CNC solution having a high concentration;
(5) formulating a lactic acid solution having a concentration of 10 wt % and a glucose solution having a concentration of 10 wt %, evenly mixing 4 wt % of the CNC suspension obtained in the step (4) with 10 wt % of the lactic acid solution and 10 wt % of the glucose solution according to a volume ratio of 10:1:2, and then performing an ultrasonic treatment at an ultrasonic frequency of 40 KHz for 10 min with a temperature controlled at 10° C., to obtain a CNC/lactic acid/glucose mixed solution; and
(6) measuring 5 ml of the CNC/lactic acid/glucose mixed solution of the step (5) and filling it into a polystyrene culture dish having a diameter of 35 mm, and naturally drying at a temperature of 30° C. and a humidity of 60% for 84 h, to obtain a CNC/lactic acid/glucose composite film, i.e. the wavelength-controllable cellulose iridescent film.

Example 4

A preparation method for a wavelength-controllable cellulose iridescent film containing a lactic acid solution and a glucose solution comprises the following steps:
(1) mixing 20 g of an absolutely dry coniferous wood pulp with 180 ml of a concentrated sulfuric acid solution having a concentration of 64 wt %, stirring at 55° C. under a rotation speed of 400 r/min for 45 min, and adding deionized water having a volume 10 times that of the concentrated sulfuric acid solution for ending a reaction, to obtain a white milky solution;
(2) centrifuging the white milky solution of the step (1) at 10° C. under a speed of 8000 r/min for 12 min, taking an upper layer of suspension, repeating the centrifuging for 3 times, and combining the suspensions;
(3) pouring the combined suspension of the step (2) into a dialysis bag having a molecular weight of 14000, and dialysing with deionized water until the suspension becomes a neutral suspension;
(4) concentrating the neutral suspension obtained in the step (3) by means of a rotary evaporation with a temperature for the rotary evaporation of 40° C. and a time for the rotary evaporation of 55 min, to obtain a CNC solution having a high concentration;
(5) formulating a lactic acid solution having a concentration of 10 wt % and a glucose solution having a concentration of 15 wt %, evenly mixing 3 wt % of the CNC suspension obtained in the step (4) with 10 wt % of the lactic acid solution and 15 wt % of the glucose solution according to a volume ratio of 9:1:2, and then performing an ultrasonic treatment at an ultrasonic frequency of 40 KHz for 8 min with a temperature controlled at 10° C., to obtain a CNC/lactic acid/glucose mixed solution; and
(6) measuring 5 ml of the CNC/lactic acid/glucose mixed solution of the step (5) and filling it into a polystyrene culture dish having a diameter of 35 mm, and naturally drying at a temperature of 30° C. and a humidity of 55% for 72 h, to obtain a CNC/lactic acid/glucose composite film, i.e. the wavelength-controllable cellulose iridescent film.

Example 5

A preparation method for a wavelength-controllable cellulose iridescent film containing a lactic acid solution and a glucose solution comprises the following steps:
(1) mixing 20 g of an absolutely dry coniferous wood pulp with 200 ml of a concentrated sulfuric acid solution having a concentration of 60 wt %, stirring at 55° C. under a rotation speed of 400 r/min for 50 min, and adding deionized water having a volume 10 times that of the concentrated sulfuric acid solution for ending a reaction, to obtain a white milky solution;
(2) centrifuging the white milky solution of the step (1) at 10° C. under a speed of 10000 r/min for 10 min, taking an upper layer of suspension, repeating the centrifuging for 3 times, and combining the suspensions;
(3) pouring the combined suspension of the step (2) into a dialysis bag having a molecular weight of 14000, and dialysing with deionized water until the suspension becomes a neutral suspension;

(4) concentrating the neutral suspension obtained in the step (3) by means of a rotary evaporation with a temperature for the rotary evaporation of 35° C. and a time for the rotary evaporation of 55 min, to obtain a CNC solution having a high concentration;

(5) formulating a lactic acid solution having a concentration of 10 wt % and a glucose solution having a concentration of 20 wt %, evenly mixing 4 wt % of the CNC suspension obtained in the step (4) with 10 wt % of the lactic acid solution and 20 wt % of the glucose solution according to a volume ratio of 8:1:2, and then performing an ultrasonic treatment under an ultrasonic frequency of 30 KHz for 5 min with a temperature controlled at 10° C., to obtain a CNC/lactic acid/glucose mixed solution; and (6) measuring 5 ml of the CNC/lactic acid mixed solution of the step (5) and filling it into a polystyrene culture dish having a diameter of 35 mm, and naturally drying at a temperature of 35° C. and a humidity of 55% for 72 h, to obtain a CNC/lactic acid/glucose composite film, i.e. the wavelength-controllable cellulose iridescent film.

Comparative Example 1

A preparation method for a cellulose iridescent film containing a lactic acid solution comprises the following steps:

(1) mixing 20 g of an absolutely dry coniferous wood pulp with 200 ml of a concentrated sulfuric acid solution having a concentration of 60 wt %, stirring at 50° C. under a rotation speed of 400 r/min for 50 min, and adding deionized water having a volume 10 times that of the concentrated sulfuric acid solution for ending a reaction, to obtain a white milky solution;

(2) centrifuging the white milky solution of the step (1) at 10° C. under a speed of 10000 r/min for 10 min, taking an upper layer of suspension, repeating the centrifuging for 3 times, and combining the suspensions;

(3) pouring the combined suspension of the step (2) into a dialysis bag having a molecular weight of 14000, and dialysing with deionized water until the suspension becomes a neutral suspension;

(4) concentrating the neutral suspension obtained in the step (3) by means of a rotary evaporation, with a temperature for the rotary evaporation of 45° C. and a time for the rotary evaporation of 50 min, to obtain a CNC solution having a high concentration;

(5) formulating a lactic acid solution having a concentration of 9 wt %, evenly mixing 3 wt % of the CNC suspension obtained in the step (4) with 9 wt % of the lactic acid solution according to a volume ratio of 11:1, and then performing an ultrasonic treatment at an ultrasonic frequency of 40 KHz for 10 min with a temperature controlled at 10° C., to obtain a CNC/lactic acid mixed solution; and (6) measuring 5 ml of the CNC/lactic acid mixed solution of the step (5) and filling it into a polystyrene culture dish having a diameter of 35 mm, and naturally drying at a temperature of 30° C. and a humidity of 50% for 72 h, to obtain a CNC/lactic acid composite film, i.e. the cellulose iridescent film.

Comparative Example 2

A preparation method for a cellulose iridescent film containing a lactic acid solution comprises the following steps:

(1) mixing 20 g of an absolutely dry coniferous wood pulp with 160 ml of a concentrated sulfuric acid solution having a concentration of 70 wt %, stirring at 45° C. under a rotation speed of 300 r/min for 55 min, and adding deionized water having a volume 10 times that of the concentrated sulfuric acid solution for ending a reaction, to obtain a white milky solution;

(2) centrifuging the white milky solution of the step (1) at 0° C. under a speed of 8000 r/min for 12 min, taking an upper layer of suspension, repeating the centrifuging for 4 times, and combining the suspensions;

(3) pouring the combined suspension of the step (2) into a dialysis bag having a molecular weight of 14000, and dialysing with deionized water until the suspension becomes a neutral suspension;

(4) concentrating the neutral suspension obtained in the step (3) by means of a rotary evaporation with a temperature for the rotary evaporation of 35° C. and a time for the rotary evaporation of 60 min, to obtain a CNC solution having a high concentration;

(5) formulating a lactic acid solution having a concentration of 10 wt %, evenly mixing 4 wt % of the CNC suspension obtained in the step (4) with 10 wt % of the lactic acid solution according to a volume ratio of 10:1, and then performing an ultrasonic treatment at an ultrasonic frequency of 20 KHz for 10 min with a temperature controlled at 10° C., to obtain a CNC/lactic acid solution mixed solution; and (6) measuring 5 ml of the CNC/lactic acid mixed solution of the step (5) and filling it into a polystyrene culture dish having a diameter of 35 mm, and naturally drying at a temperature of 35° C. and a humidity of 60% for 96 h, to obtain a CNC/lactic acid composite film, i.e. the cellulose iridescent film.

Comparative Example 3

A preparation method for a wavelength-controllable cellulose iridescent film containing a glucose solution comprises the following steps:

(1) mixing 20 g of an absolutely dry coniferous wood pulp with 200 ml of a concentrated sulfuric acid solution having a concentration of 60 wt %, stirring at a temperature of 50° C. under a rotation speed of 400 r/min for 50 min, and adding deionized water having a volume 10 times that of the concentrated sulfuric acid solution for ending a reaction, to obtain a white milky solution;

(2) centrifuging the white milky solution of the step (1) at 10° C. under a speed of 10000 r/min for 10 min, taking an upper layer of suspension, repeating the centrifuging for 3 times, and combining the suspensions;

(3) pouring the combined suspension of the step (2) into a dialysis bag having a molecular weight of 14000, and dialysing with deionized water until the suspension becomes a neutral suspension;

(4) concentrating the neutral suspension obtained in the step (3) by means of a rotary evaporation, with a temperature for the rotary evaporation of 45° C. and a time for the rotary evaporation of 50 min, to obtain a CNC solution having a high concentration;

(5) formulating a glucose solution having a concentration of 15 wt %, evenly mixing 3 wt % of the CNC suspension obtained in the step (4) with 15 wt % of the glucose solution according to a volume ratio of 11:2, and then performing an ultrasonic treatment at an ultrasonic frequency of 40 KHz for 10 min with a temperature controlled at 10° C., to obtain a CNC/ glucose mixed solution; and (6) measuring 5 ml of the CNC/glucose mixed solution of the step (5) and filling it into a polystyrene culture dish having a diameter of 35 mm, and naturally drying at a temperature of 30° C. and a humidity of 50% for 72 h, to obtain a CNC/glucose composite film, i.e. the cellulose iridescent film.

Comparative Example 4

A preparation method for a cellulose iridescent film containing a glucose solution comprises the following steps:
(1) mixing 20 g of an absolutely dry coniferous wood pulp with 160 ml of a concentrated sulfuric acid solution having a concentration of 70 wt %, stirring at 45° C. under a rotation speed of 300 r/min for 55 min, and adding deionized water having a volume 10 times that of the concentrated sulfuric acid solution for ending a reaction, to obtain a white milky solution;
(2) centrifuging the white milky solution of the step (1) at 0° C. under a speed of 8000 r/min for 12 min, taking an upper layer of suspension, repeating the centrifuging for 4 times, and combining the suspensions;
(3) pouring the combined suspension of the step (2) into a dialysis bag having a molecular weight of 14000, and dialysing with deionized water until the suspension becomes a neutral suspension;
(4) concentrating the neutral suspension obtained in the step (3) by means of a rotary evaporation with a temperature for the rotary evaporation of 35° C. and a time for the rotary evaporation of 60 min, to obtain a CNC solution having a high concentration;
(5) formulating a glucose solution having a concentration of 10 wt %, evenly mixing 4 wt % of the CNC suspension obtained in the step (4) with 10 wt % of the glucose solution according to a volume ratio of 10:2, and then performing an ultrasonic treatment at an ultrasonic frequency of 40 KHz for 10 min with a temperature controlled at 10° C., to obtain a mixed solution of CNC/glucose solution; and
(6) measuring 5 ml of the CNC/glucose mixed solution of the step (5) and filling it into a polystyrene culture dish having a diameter of 35 mm, and naturally drying at a temperature of 35° C. and a humidity of 60% for 96 h, to obtain a CNC/glucose composite film, i.e. the cellulose iridescent film.

Figure 2:
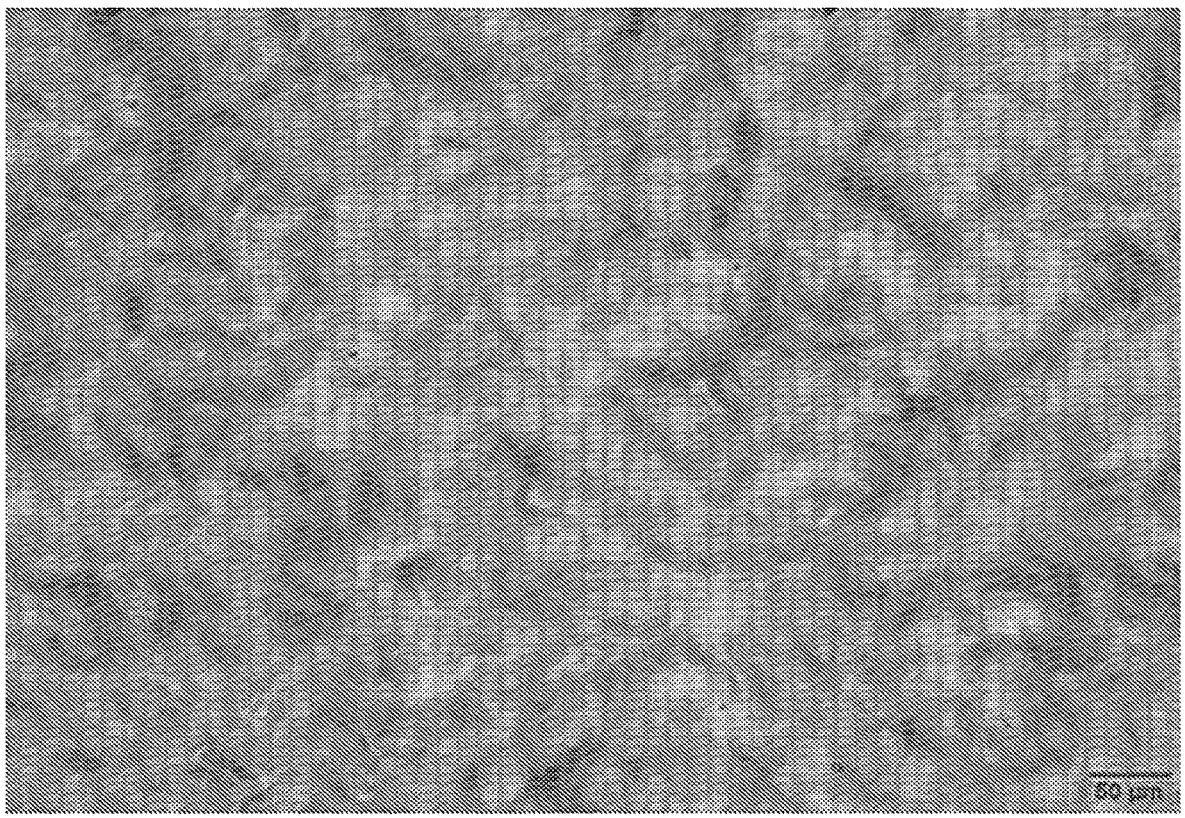
FIG. 2 is a micrograph of the cellulose iridescent film prepared in Example 1 observed under optical microscope.
Figure 3:
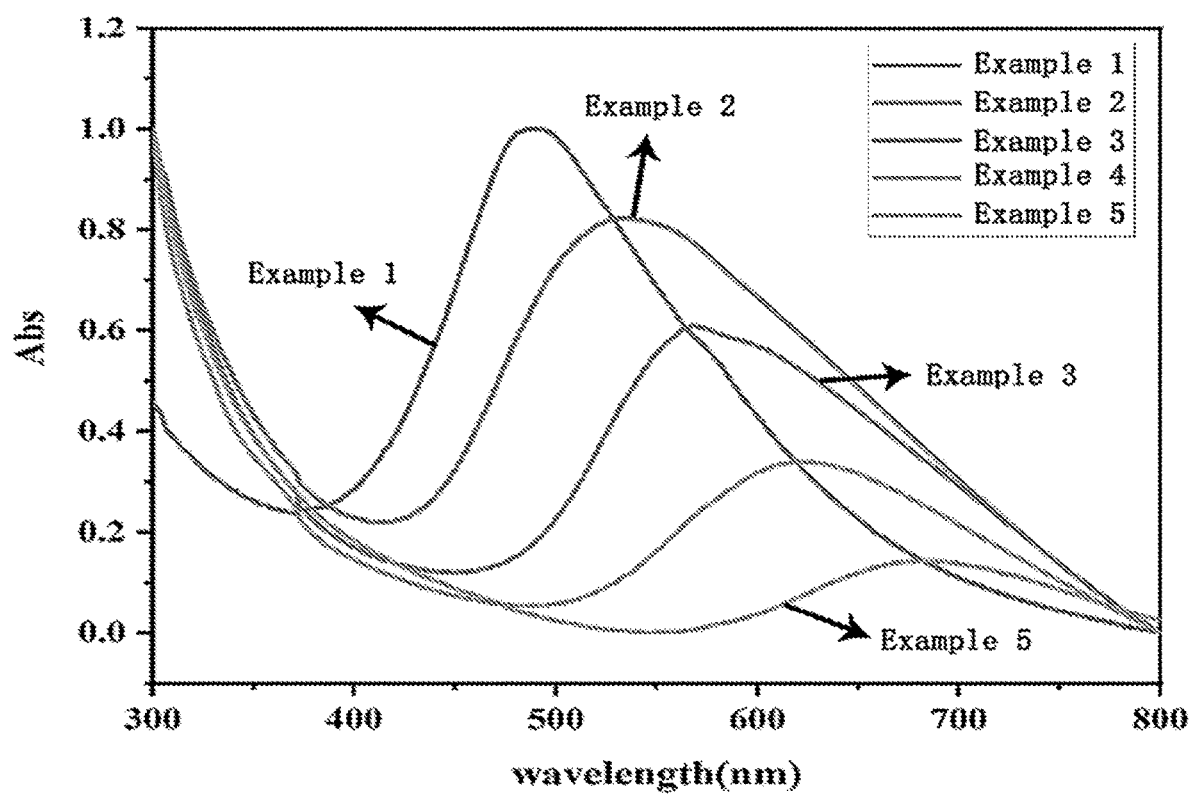
FIG. 3 is ultraviolet-visible light absorption spectrums for the iridescent films prepared by mixing the CNC with the lactic acid solution and the glucose solution according to different proportions in Examples 1-5.
Figure 4:
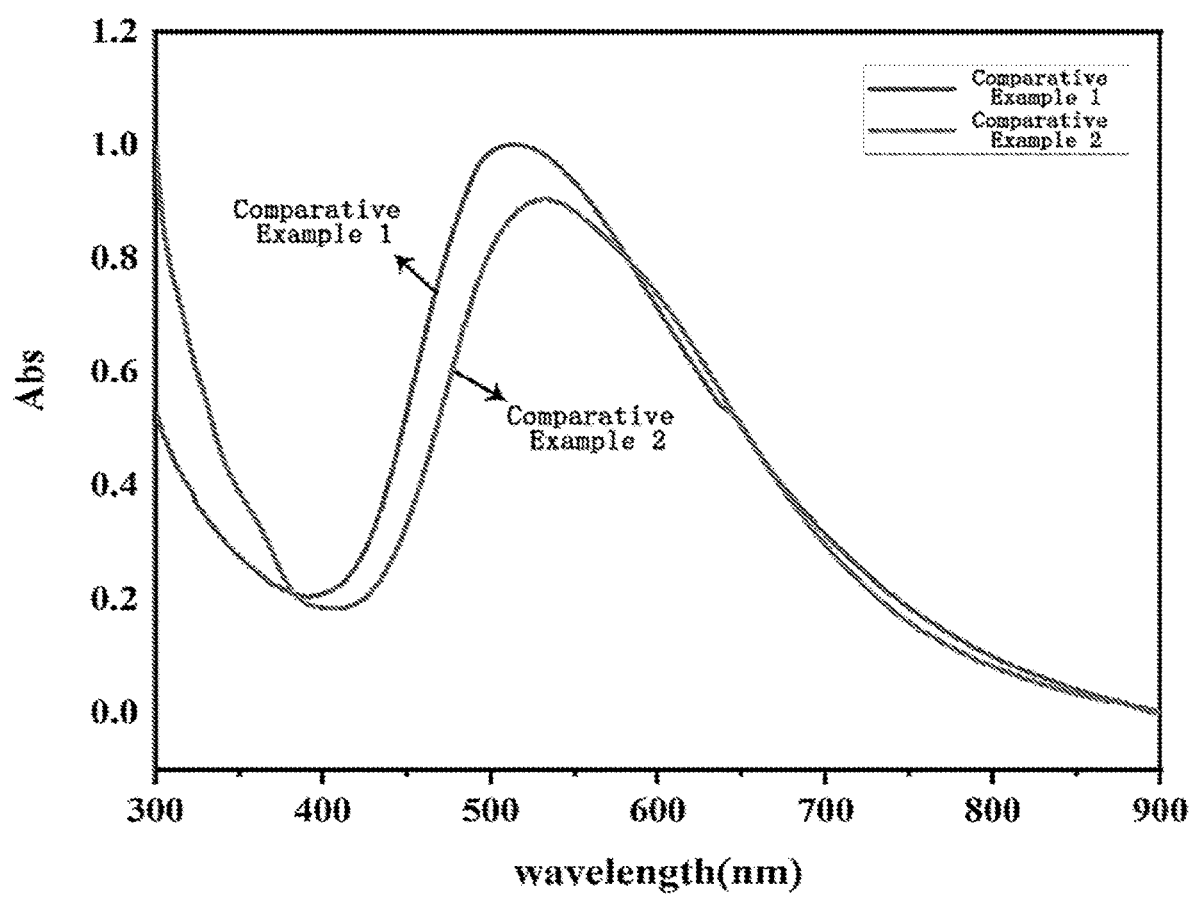
FIG. 4 is ultraviolet-visible light absorption spectrums for the iridescent films prepared by mixing the CNC with the lactic acid solution according to different proportions in Comparative Examples 1-2.
Figure 5:
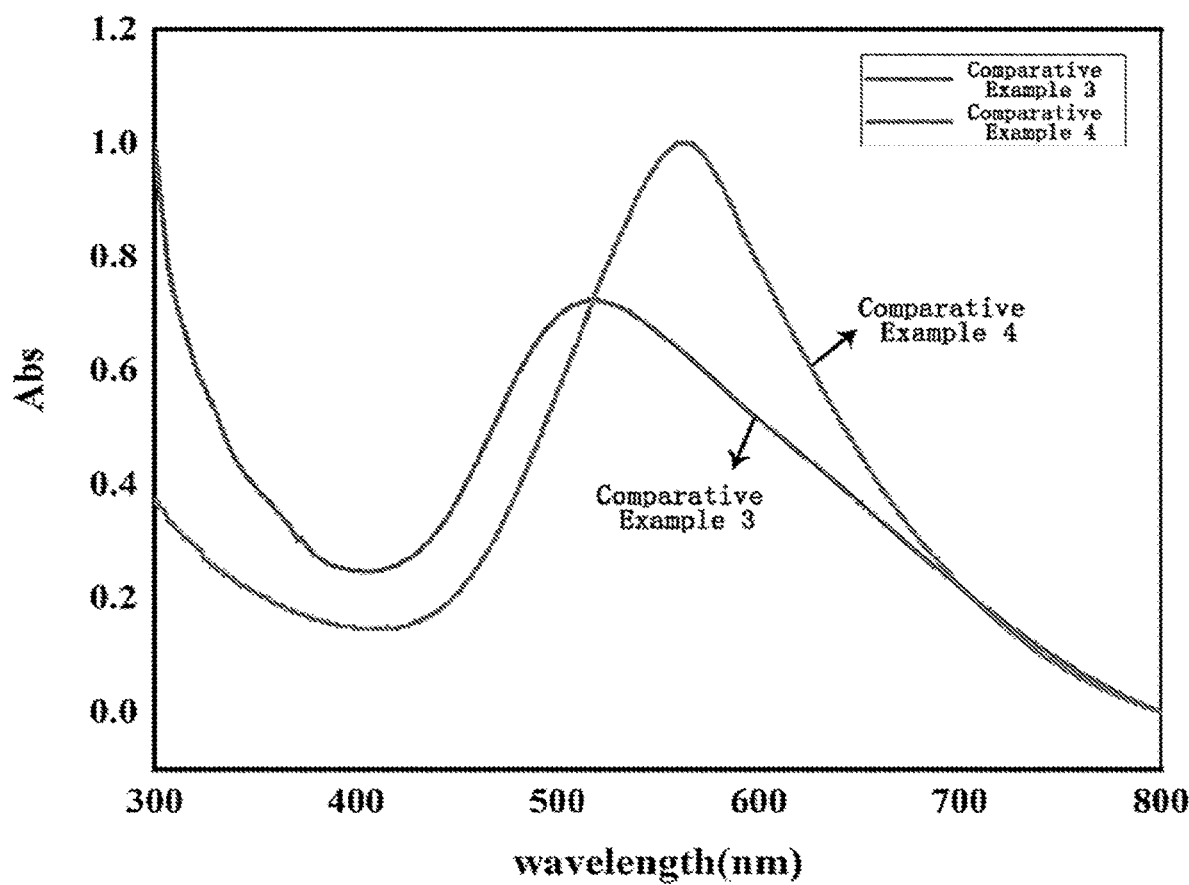
FIG. 5 is ultraviolet-visible light absorption spectrums for the iridescent films prepared by mixing the CNC with the glucose solution according to different proportions in Comparative Examples 3-4.

Films formed in the above-described Examples 1-5 all show stronger characteristics of the iridescent film. FIG. 1 is a SEM micrograph in Example 1, showing obvious layered structural characteristics of the iridescent film; FIG. 2 is an imaging under an optical microscope in Example 1, showing an obvious birefringence phenomenon of the iridescent film; and FIG. 3 is absorption wavelengths for the films formed by Examples 1-5, and it can be seen that wavelengths upon mixing according to different proportions of the CNC with the lactic acid solution and the glucose solution are all controlled within the range of visible light, and wavelengths of 488-686 nm correspond respectively to five colors of blue, green, yellow, orange, and red colors, which demonstrate that it can be realized to precisely control wavelengths within different colors ranges by these ratios of raw materials. Comparative Example 1 and Comparative Example 2 are respectively cellulose iridescent films without containing the glucose, prepared according to the methods for formulation ratios of raw materials of the CNC suspension and the lactic acid solution in Example 2 and Example 3. FIG. 4 is ultraviolet-visible light absorption spectrums for the iridescent films mixing the CNC with the lactic acid solution in different proportions in Comparative Examples 1-2. FIG. 4 demonstrates that the cellulose iridescent films prepared by only adding CNC suspension and the lactic acid solution can't realize control for wavelengths of different colors, and these two Comparative Examples belong to a wavelength within green color range in common. Comparative Example 3 and Comparative Example 4 are respectively cellulose iridescent films without containing the lactic acid, prepared according to the methods for formulation ratios of raw materials of the CNC suspension and the glucose solution in Example 2 and Example 3. FIG. 5 is ultraviolet-visible light absorption spectrums for the iridescent films mixing the CNC with the glucose solution in different proportions in Comparative Examples 3-4. FIG. 5 demonstrates that the cellulose iridescent films prepared by only adding CNC suspension and the glucose solution can't realize control for wavelengths of different colors, and these two Comparative Examples belong to a wavelength within green color range in common.

The above Examples are only preferred embodiments of the present invention, only used for explaining the present invention, and not to limit the present invention. Changes, substitutions, modifications, etc. made by those skilled in the art without departing from spirit of the present invention all belong to a protection scope of the present invention.

The invention claimed is:

1. A preparation method for a wavelength-controllable cellulose iridescent film, characterized in that, it comprises the following steps:
   (1) evenly mixing a CNC suspension with a lactic acid solution and a glucose solution, to obtain a CNC/lactic acid/glucose mixed solution, wherein the CNC suspension is a suspension of a cellulose nanocrystal; and
   (2) drying the CNC/lactic acid/glucose mixed solution to form a film, to obtain a cellulose iridescent film, wherein:
   in step (1), a volume ratio of the CNC suspension to the lactic acid solution and the glucose solution is (12-8):1:(2-3);
   in step (1), a concentration of the cellulose nanocrystal in the CNC suspension is 3 wt %-4 wt %; and
   a concentration of the lactic acid solution is 8 wt %-10 wt %, and a concentration of the glucose solution is 10 wt %-20 wt %.

2. The preparation method for the wavelength-controllable cellulose iridescent film according to claim 1, characterized in that a solvent of the lactic acid solution is water and a solvent of the glucose solution is water wherein:
   when the volume ratio of the CNC solution to the lactic acid solution and the glucose solution is 12:1:3, the film is formed to show blue color;
   when the volume ratio is 11:1:2, the film is formed to show green color;
   when the volume ratio is 10:1:2, the film is formed to show yellow color;
   when the volume ratio is 9:1:2, the film is formed to show orange color; and
   when the volume ratio is 8:1:2, the film is formed to show red color.

3. The preparation method for the wavelength-controllable cellulose iridescent film according to claim 1, characterized in that:
   in step (1), the cellulose nanocrystal in the CNC suspension has a dimension of a length of 100-400 nm, and a width of 20-50 nm; and in step (2), the drying has the following conditions: a temperature of 30-35° C., an ambient humidity of 50%-60%, and a time for the drying of 3-5 days.

4. The preparation method for the wavelength-controllable cellulose iridescent film according to claim 1, characterized in that in step (1), the CNC suspension is prepared by the following method: mixing a wood pulp or a cellulose with a concentrated sulfuric acid, performing a heating treatment at a condition of stirring, adding water for ending a reaction, centrifuging, dialysing to neutrality, and concentrating, to obtain the CNC suspension.

5. The preparation method for the wavelength-controllable cellulose iridescent film according to claim 4, characterized in that:
  a concentration of the concentrated sulfuric acid is 60 wt %-70 wt %;
  a mass volume ratio of the wood pulp or the cellulose to the concentrated sulfuric acid is 1 g:(8-10) mL;
  a rotation speed for the stirring is 300-400 rpm;
  a temperature for the heating treatment is 45-55° C.; and
  a time for the heating treatment is 45-55 min.

6. The preparation method for the wavelength-controllable cellulose iridescent film according to claim 4, characterized in that:
  a volume ratio of the concentrated sulfuric acid to the water for ending the reaction is 1:(10-15);
  a molecular weight cut-off of a dialysis bag is 12000-14000, and a dialyzate is water;
  the number of times for the centrifuging is 3-4 times, a rotation speed for the centrifuging is 8000-10000 rpm, a time for the centrifuging is 10-12 min, and a temperature for the centrifuging is 0-10° C.; and
  the concentrating is rotary evaporation, a temperature for the rotary evaporation is 35-45° C., and a time for the rotary evaporation is 50-60 min.

7. The preparation method for the wavelength-controllable cellulose iridescent film according to claim 4, characterized in that in step (1), the evenly mixing refers to a preceding stirring treatment, and a posterior ultrasonic treatment.

8. The preparation method for the wavelength-controllable cellulose iridescent film according to claim 7, characterized in that, during the evenly mixing, a time for the stirring treatment is 15-30 min, a rotation speed for the stirring treatment is 300-400 rpm, a time for the ultrasonic treatment is 5-10 min, and an ultrasonic frequency for the ultrasonic treatment is 20-40 KHz.

\* \* \* \* \*